April 25, 1933.  M. BERNSTEIN  1,906,043
DOG HARNESS
Filed Feb. 4, 1931
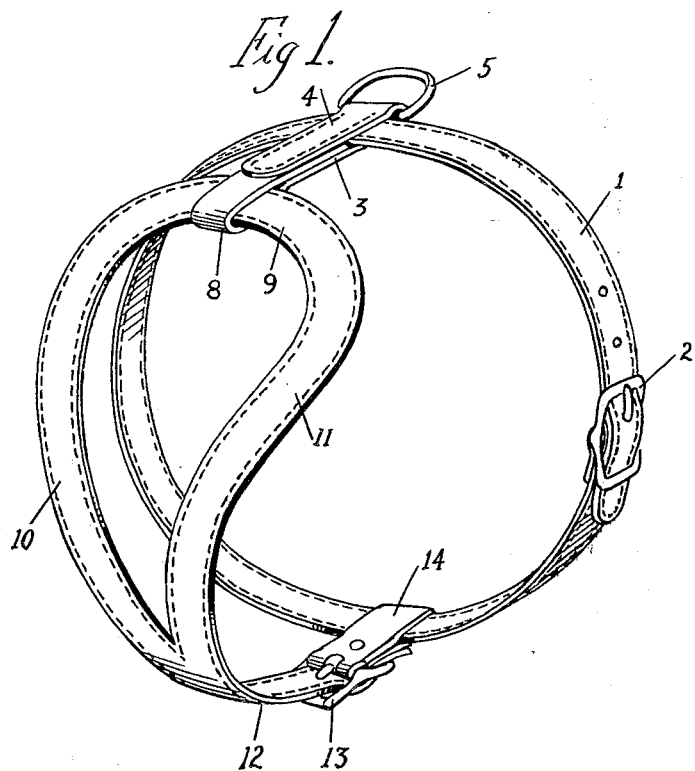
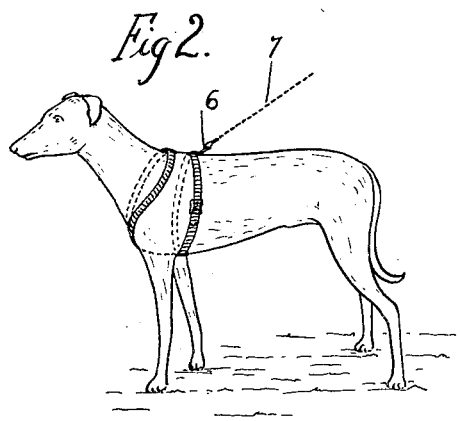
Inventor,
Max Bernstein,
By Arthur H. Ewald,
Attorney.

Patented Apr. 25, 1933

1,906,043

UNITED STATES PATENT OFFICE

MAX BERNSTEIN, OF CINCINNATI, OHIO

DOG HARNESS

Application filed February 4, 1931. Serial No. 513,300.

My invention relates to harness for dogs and similar pet animals.

The principal object of the present invention is to provide a simple and inexpensive harness to which a leash may be secured, and which in use will contribute to the comfort and well being of the animal.

Various types of dog harness have heretofore been used, and all of such devices have consisted of certain straps and trappings, which, at least on certain occasions are apt to produce chafing and discomfort to the animal. In the construction of such devices, furthermore, a multiplicity of rivets and similar fastenings have been employed which add to the expense of manufacture. It is to overcome these difficulties that my present invention is principally directed.

In the drawing:

Figure 1 is a perspective of a harness constructed in accordance with this invention.

Figure 2 is a view of the harness in use.

My new harness consists first, of a body strap 1, provided with a buckle 2, said strap being adapted to fit around the body of the animal behind its forelegs. Secured to the body strap 1 is a longitudinal loop member 3 which is secured to the strap 1 by means of stitching 4, or other suitable means. The loop member 3 carries a ring 5 to the rear of the body strap 1 which is adapted to receive the clip 6 of the leash 7. The free end of the member 3 carries a loop 8 through which the upper portion of the collar strap 9 passes slidably. The collar strap 9 is preferably formed in the shape of an elongated loop, which is wider at its top, as clearly indicated in Figure 1, from a single flat piece of leather or other suitable material, the side members 10 and 11 of said loop uniting at the bottom to form a strap 12 which is adjustably engaged by a buckle 13 secured by a loop 14 to the lower portion of the body strap 1.

The manner of using my new harness as above described, is clearly indicated in Figure 2 of the drawing. The head of the dog is inserted through the collar strap 9, the sides 10 and 11 of which are thus caused to rest on the shoulders of the animal. The body strap is thus secured around the body of the dog behind the forelegs by means of the buckle 2, and the strap 12 of the collar is secured in the buckle 13 underneath the animal's chest. The leash is secured to the ring.

When equipped with the harness, the animal is allowed to move about with great freedom, and when placing strain on the leash such strain is applied to the animal's shoulders through the collar strap 9, where it produces no discomfort or injury. The use of my new harness, therefore, contributes to the comfort and well beging being of pet animals when led by a leash.

Having thus fully described my invention, what I claim as new and desire to secure by Letters Patent is:

1. A harness of the type described comprising a body strap, a collar, said collar comprising an elongated loop wider at the top and terminating in a unitary strap at the bottom, said collar and strap being formed from a single flat piece of material without seams, means for securing the upper portion of said collar to said body strap, and means for securing the lower strap of said collar to the lower portion of said body strap.

2. A harness of the type described comprising a body strap, a loop member secured to the upper portion of said body strap, a ring carried by said loop member, a collar, said collar comprising an elongated loop wider at the top and terminating in a unitary strap at the bottom, said collar and strap being formed from a single flat piece of material without seams the upper portion of said collar being slidably secured in said loop member, and means for securing the lower strap of said collar to the said body strap.

MAX BERNSTEIN.